July 6, 1965 J. T. BOATWRIGHT 3,193,771

FREQUENCY MODULATION SIGNAL ENHANCER

Filed Feb. 6, 1961

INVENTOR.
JOHN T. BOATWRIGHT

BY

Walter J. Kreske
ATTORNEY 3,193,771

FREQUENCY MODULATION SIGNAL ENHANCER

John T. Boatwright, Waltham, Mass., assignor to General Electronic Laboratories, Inc., Cambridge, Mass., a corporation of Massachusetts Filed Feb. 6, 1961, Ser. No. 87,422
7 Claims. (Cl. 329—134)

This invention relates to frequency modulation signal enhancers, and more prticularly to a system for preferentially increasing the amplitude of frequency modulation signals with a respect to the environment noise.

Heretofore, such devices as parametric amplifiers have been used at the front end of receivers to reduce random noise generated at the receiver. Other devices for combating random noise include phase lock systems appearing usually at the end of the intermediate frequency amplifier. These systems have been found inadequate for improving signal to noise ratio beyond six decibels. One of the reasons for this in the phase lock systems is that usually they depend on frequency modulation index. While a parametric amplifier reduces noise generated at the front end of a receiver, it is not capable of suppressing noise which enters the receiver from the antenna.

These problems have been overcome in the present invention which also incorporates other desirable features and advantages.

Among these other features and advantages are a frequency modulation signal enhancing system which, in addition to being independent of modulation index and independent of noise source, is relatively simple in its construction. Another desirable feature is that it is compatible with existing FM receivers and can easily be incorporated therein. A further advantage is that it provides a frequency modulation signal enhancing system which lends itself to extremely compact construction and is long lived and reliable in its operation.

A primary object of the present invention is the provision of a frequency modulation signal enhancing system which has a tremendous capability for recovering frequency modulation signals from even a high noise environment.

Another object is the provision of a frequency modulation signal enhancing system which is independent of frequency modulation index.

And a further object is the provision of a frequency modulation signal enhancing system which is independent of the source of random noise whether from the receiver itself or from external sources.

And another object is the provision of a frequency modulation signal enhancing system which lends itself to extremely compact construction.

A still further object is the provision of a frequency modulation signal enhancing system which is compatible with existing frequency modulation receivers, it being relatively easily incorporated therein.

Another object is the provision of a frequency modulation signal enhancing system which is relatively simple and inexpensive in its construction, reliable in its operation and which has a long life compatible with that of other structures in existing receivers.

These and other objects, features and advantages are achieved generally by providing a feedback loop in the frequency modulation signal path, having at least one two terminal limiter and an amplifier in the feedback loop, with the two terminal limiter including two back-to-back semi-conductor diodes, each having a selected forward conduction characteristic.

By providing silicon computer diodes for the two back-to-back semi-conductor diodes, a forward characteristic approaching the ideal desired is thereby achieved.

By providing a tuned circuit in parallel with the back-to-back semi-conductor diode limiters, tuned to the desired operating frequency, limiter operation at the desired radio frequency is thereby achieved.

By providing two amplifiers and two terminal limiters in the feedback loop, a marked expansion in operating bandwidth is thereby achieved.

By inserting the signal enhancer in the frequency modulation signal path between the intermediate frequency amplifier and the demodulator, the desired signal operating levels are thereby achieved.

By providing a pentode at the input and a pentode at the output of the frequency modulation signal enhancer, suitable isolation from the remainder of the receiver circuit in which the device is to operate is thereby achieved, thereby making it compatible for use and insertion in existing receiver circuits.

These and other features, objects and advantages will become more apparent from the following description taken in connection with the accompanying drawing of a preferred embodiment of the invention and wherein.

Figures 1, 2:
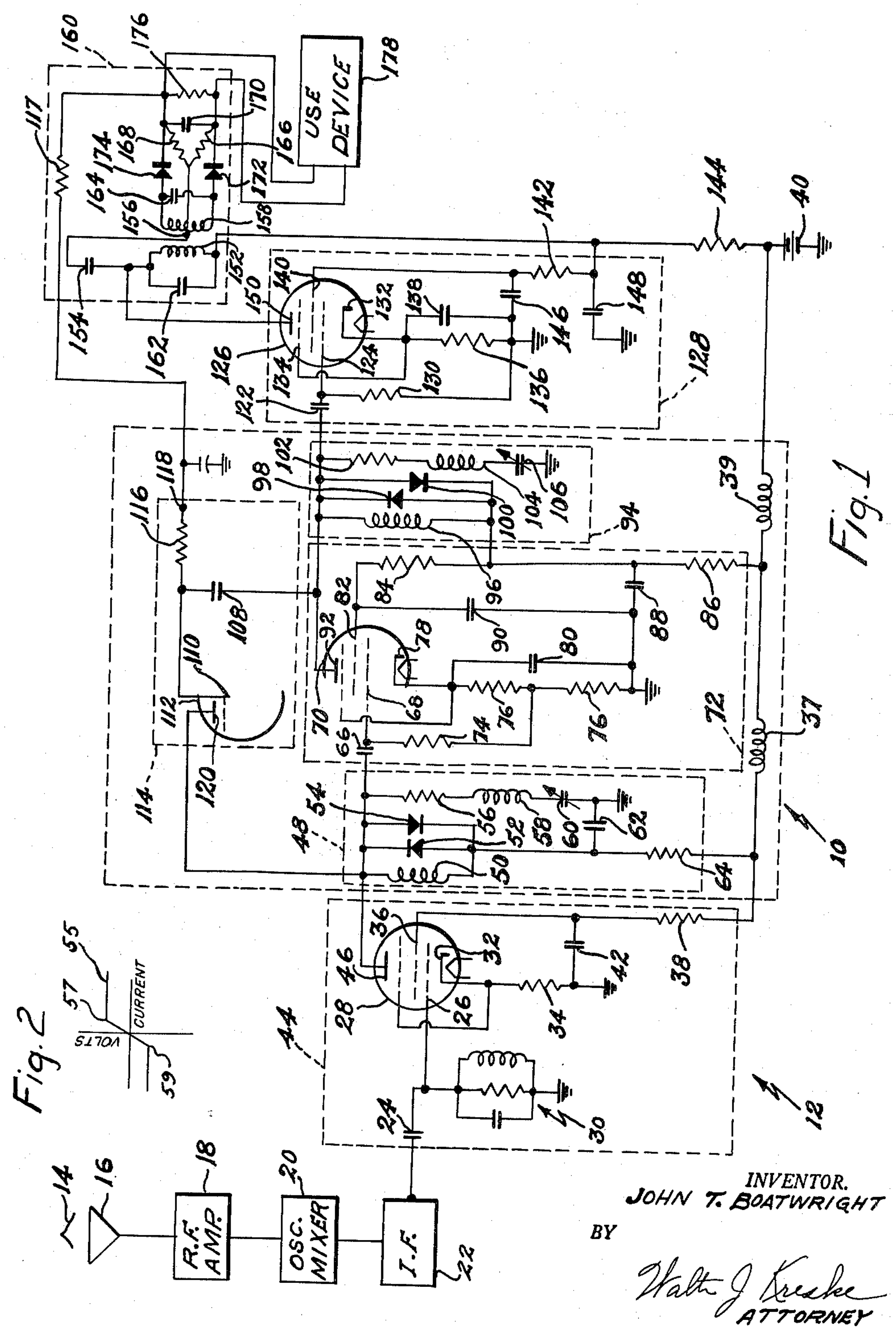
FIG. 1 is a partially block and partially schematic diagram of a frequency modulation receiver with a signal enhancing system constructed to operate in accordance with the present invention.
FIG. 2 is a graph for more clearly illustrating operation of the present invention.

Referring to FIG. 1 in more detail, a frequency modulation signal enhancer made in accordance with the present invention is designated generally by the numeral 10, and shown coupled in the illustrative embodiment of FIG. 1 in a frequency modulation receiver 12. In the frequency modulation receiver 12, a frequency modulation signal 14 appears through an antenna 16, a conventional radio frequency amplifier 18 and oscillator mixer circuit 20 to an intermediate frequency amplifier 22. The output of the intermediate frequency amplifier 22 will contain not only the amplified beat frequency of the oscillator 20 and the input radio signal 14, but also noise entering the antenna 16 as well as noise generated within the receiver components mentioned and within the frequency band of the intermediate frequency amplifier 22. This combined beat frequency modulation signal and noise will appear through a coupling capacitor 24 at a control grid 6 of a pentode 28 such as a 6BA6. A parallel resonant circuit 30 having preferably a bandwidth substantially equal to the operating bandwidth of the receiver 12, which in the present instance, by way of illustration and not limitation thereof, is 100 kc., is tied to the control grid 26 of the pentode 28.

The input amplifier pentode 28 has a cathode 32 coupled to ground through a biassing resistor 34. The pentode 28 also has a screen grid 36 which is supplied voltage through a screen dropping resistor 38 and radio frequency choke coils 37 and 39 from a positive terminal of a B+ power source such as the positive terminal of a battery 40. A radio frequency bypass capacitor 42 is coupled between the screen grid 36 and ground to prevent radio frequency signals from appearing at the screen grid.

The coupling capacitor 24, tuned circuit 30, and input amplifier pentode 28, with associated circuitry form an input amplifier 44 to be hereinafter further described. The input amplifier pentode 28 has an anode 46 coupled to a two terminal limiter circuit 48 and more specifically is coupled to one side of an inductive reactance 50 which is tied across back-to-back semi-conductor diodes 52 and 54. The function of the inductive reactance 50 is to tune out the inherent capacitive reactance of the diodes 52 and 54 and distribute capacitance within the circuits. The semi-conductor diodes 52 and 54 are preferably silicon computer diodes having conduction and saturation characteristics shown by the curve 55 and will be hereinafter further described. It is important that the diodes 52 and 54 have threshold voltage points 57 and 59 respectively which are well defined and flat post threshold characteristics as shown by the curve 55. A series coupled resistor 56, inductor 58 and variable capacitor 60 are connected through a bypass capacitor 62 in parallel with the back-to-back diode limiters 52 and 54 for purposes of phase broadening during operation. A decoupling resistor 64 in the two terminal limiter circuit 48 is provided for decoupling from the B+ power source 40. The limiter circuit 48 may also be considered as an inductive, capacitive oscillatory circuit coextensive in bandwidth with that of the intermediate frequency amplifier 22 and having a pair of silicon diodes 52 and 54 coupled in parallel and in opposed current conducting relation to each other across the oscillatory circuit.

Plate 46 of the input amplifier pentode 28 is also coupled through a coupling capacitor 66 to a control grid 68 of a sharp cutoff pentode 70 such as a 6AT8, in a forward amplifier circuit 72. The control grid 68 is also coupled through a grid leak resistor 74 to a resistive divider 76 which provides bias circuit to ground for cathode 78. The divider resistors 76 in the cathode bias circuit are bypassed to ground through bypass capacitor 80. The sharp cutoff pentode 70 has a screen grid 82 which is fed voltage through a screen grid dropping resistor 84 and a decoupling resistor 86 in series with the positive terminal of the B+ power source 40. The decoupling resistor 86 is also bypassed to ground through a decoupling capacitor 88. A screen grid bypass capacitor 90 is coupled between the screen grid 82 and ground to prevent radio frequency signals from appearing at the screen grid 82.

The sharp cutoff pentode 70 has an anode 92 coupled to one side of a second two terminal limiter 94, and in particular is coupled to one side of an inductance 96 which appears in parallel across back-to-back semiconductor diode rectifiers 98 and 100, preferably similar to the diodes 52 and 54. Inductance 96 is fed from the decoupling resistor 86. A resistor 102 in series with an inductance 104 and variable capacitor 106, all in parallel with the diode rectifiers 98 and 100 provide a phase broadening circuit. The two terminal limiter 94 with the associated components as described may be substantially identical in type and values with those in the two terminal limiter 48.

The anode 92 of the sharp cutoff pentode 70 is coupled through a coupling capacitor 108 to a control grid 110 of a triode 112 in a feed-back amplifier circuit 114. The feedback amplifier triode 112 in the present instance is in the same envelope with pentode 70 and has the same cathode 78 as the sharp cutoff pentode 70. The control grid 110 is also coupled through an isolating resistor 116 to a tie point 118 to which a correction voltage is fed through a resistor 117 as will be hereinafter further described. The amplifier triode has an anode 120 which is tied back to the side of the two terminal limiter circuit 48 to which the anode 46 of the input amplifier pentode 28 is tied.

This completes a feedback loop comprised of the two terminal limiter 48, the forward amplifier circuit 72, the two terminal limiter circuit 94 and the feedback amplifier circuit 114, all of which combine to form the frequency modulation signal enhancer 10 in accordance with the present invention.

The two terminal limiter 94, in addition to being coupled to the anode 92 of the forward amplifier tube 70 is also coupled through a coupling capacitor 122 to a control grid 124 of an output amplifier pentode 126, such as a 6AU6 in an output amplifier circuit 128. The control grid 124 is also coupled through a grid-leak resistor 130 to ground. The output amplifier pentode 126 also has a cathode 132 coupled in conventional manner to a suppressor grid 134 and through a cathode biasing resistor 136 to ground. A bypass capacitor 138 is placed across the biasing resistor 136.

The output amplifier pentode 126 also has a screen grid 140 coupled through a dropping resistor 142 which is coupled through a decoupling resistor 144 to the positive terminal of the B+ power source 40. The screen grid 140 is also coupled through a screen grid bypass capacitor 146 to ground and the decoupling resistor 144 is bypassed to ground through a decoupling capacitor 148.

The output amplifier pentode 126 has an anode 150 coupled through a discriminator transformer primary 152 to the decoupling resistor 144 and through a coupling capacitor 154 to the center tap 156 of secondary 158 of the discriminator transformer in a discriminator circuit 160. A capacitor 162 across the primary 152 is provided for tuning the primary 152. In similar manner, a tuning capacitor 164 is provided across the secondary 158 for tuning the secondary 158. Also tied to the centertap 156 are two filter resistors 166 and 168 and an associated filter capacitor 170. Diodes 172 and 174 are also coupled to the respective ends of the secondary 158 and the filter capacitor 170 to complete the discriminator circuit 160. A load resistor 176 is provided across the filter capacitor 170 and across a use device 178 such as an audio amplifier or other suitable load. One side of the resistor 176 is coupled back through resistors 117 and 116 to the control grid 110 for providing negative stabilizing feedback voltage thereto.

In the operation of the present exemplary embodiment of the receiver 12, the frequency modulation beat frequency signal and noise as described above, from the intermediate frequency amplifier 22 is fed to the control grid 26 of the input amplifier pentode 28. The signal on the plate 46 is fed to the two terminal limiter circuit 48 and simultaneously to the control grid 68 of the forward amplifier pentode 70. The signal appearing on the plate 92 of the forward amplifier pentode 70 is fed to the second two terminal limiter 94 and simultaneously to the grid 110 of the feedback amplifier triode 112. The signal appearing on the plate 120 of the feedback amplifier 112 is fed back to the two terminal limiter 48 to complete the feedback loop described above, forming the frequency modulation signal enhancer 10.

The voltage appearing across the diodes 52 and 54 consists of clipped signal plus noise which has been clipped at the threshold value of the rectifiers. This clipped signal plus noise voltage appears at the control grid 68 of the forward amplifier pentode 70 which tube serves only to amplify this signal-plus-noise output from the two terminal limiter 48. This amplified signal appearing on the plate 92 is embodied in a current which is driven into the two terminal limiter 94 where further clipping is again accomplished in similar manner to that appearing in the two terminal limiter 48. This second clipped signal-plus-noise from the two terminal limiter 94 across the rectifiers 98 and 100 again appears through the coupling capacitor 108 and at the control grid 110 of the feedback amplifier 112. A corresponding signal-plus-noise appears as an output from the plate 120 of the feedback amplifier 112 and is combined with the input signal from the plate 46 of the input amplifier 28 in the two terminal limiter 48 in such a manner that it is found that the signal portion tends to enhance itself and the noise tends to cancel itself with the net effect that the signal is enhanced with respect to the noise to thereby create a larger signal to noise ratio. This improved signal to noise ratio signal is fed from the second two terminal limiter 94 through the coupling capacitor 122 and appears at the control grid 124 of the output amplifier pentode 126. This improved signal is then fed from the plate 150 of the output amplifier pentode 126 through the discriminator 160 to the use device 178.

This invention is not limited to the particular details of construction and operation described as equivalents will suggest themselves to those skilled in the art.

What is claimed is:

1. In a frequency modulation signal enhancing system, the combination of electronic valve means having a control grid and an anode, signal input means coupled to the control grid for applying the frequency modulation signal to the control grid, the signal input means including a pair of diodes coupled back-to-back and arranged for limiting the amplitude of the signals reaching the control grid, signal output means coupled to the anode, said signal output means including a pair of diodes coupled back-to-back and arranged for limiting the amplitude of the signal output from said anode, and a second electronic valve means having an anode and control grid with the grid coupled to the back-to-back diodes in the output means and the anode coupled to the back-to-back diodes in the signal input means.

2. The combination as in claim 1 wherein the diodes are silicon diodes.

3. The combination as in claim 1 wherein the first electronic valve means is a pentode and the diodes are silicon diodes of the fast computer diode variety.

4. The combination as in claim 1 wherein the signal output means includes a discriminator circuit coupled back to the control grid of the second electronic valve means for providing a stabilizing voltage thereto.

5. In a frequency modulation receiver, the combination of an intermediate frequency amplifier means having an output terminal, two oscillatory circuits tuned to the intermediate frequency band, two pairs of fast response type silicon diodes with the diodes coupled in parallel and in opposed current conducting relation to each other across each of the oscillatory circuits, two electronic valve means each having an output and control voltage terminals, output circuit means, means coupling one of the oscillatory circuits to the intermediate frequency amplifier output terminal, the control voltage terminal of one electronic valve means and output terminal of the other electronic valve means, and means coupling the other oscillatory circuit to the output terminal of said electronic valve means and the control terminal of the other electronic valve means and said output circuit means.

6. A signal enhancing system for a frequency modulation receiver of the type having an intermediate frequency amplifier with an output terminal and a discriminator having an input and output circuit, the combination of a signal enhancer input and output amplifier stages, each having a control grid and an anode with the control grid of one adapted for coupling to the output terminal of the intermediate frequency amplifier and the anode of the other adapted for coupling to the input circuit of the discriminator; a pentode having a control grid and anode and a triode having a control grid and anode in a single envelope with a common cathode; a pair of signal amplitude limiter circuits including semi-conductor diodes as the amplitude limiting elements; one of the limiter circuits coupled to the anode of the input amplifier, the anode of the triode and the control grid of the pentode; the other of the limiter circuits coupled to the anode of the pentode and control grid of the triode for providing a limiter feed back loop to said one limiter; and means for coupling the triode grid to the discriminator output circuit.

7. A frequency modulation signal enhancing system comprising an amplifier stage having an input and output circuit, means for feeding frequency modulation signals to the input circuit of the amplifier stage, the amplifier stage including a diode signal amplitude limiter coupled to the input circuit for limiting the amplitude of signals fed to the stage, a feedback loop coupled from the output circuit to the input circuit and including a second diode signal amplitude limiter for limiting the amplitude of signals fed through the loop.

References Cited by the Examiner

UNITED STATES PATENTS

| | | | |
|---|---|---|---|
| 2,457,207 | 12/48 | Carlson | 329—133 |
| 2,861,185 | 11/58 | Hopper | 328—171 |
| 2,912,573 | 11/59 | Mitchell | 329—134 X |
| 2,922,040 | 1/60 | Browder | 329—134 X |
| 2,975,274 | 3/61 | Mitchell | 329—134 |
| 3,084,327 | 4/63 | Cutler | 325—46 X |

ROY LAKE, *Primary Examiner.*

L. MILLER ANDRUS, ALFRED L. BRODY, *Examiners.*